Figure 3:
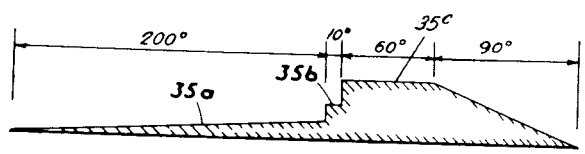

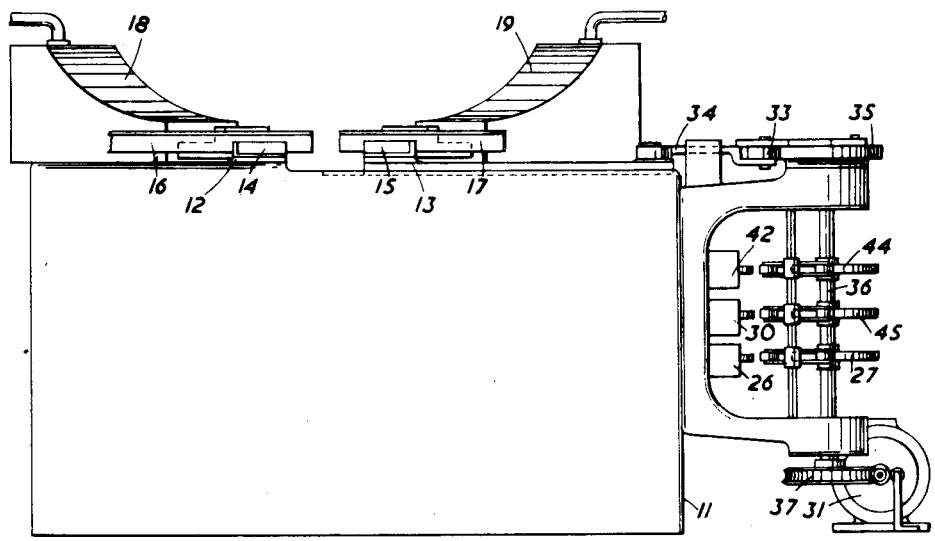

Jan. 22, 1952            L. B. WILSON            2,583,455

METHOD AND APPARATUS FOR WELDING ALUMINUM AND ITS ALLOYS

Filed July 5, 1949            2 SHEETS—SHEET 2

INVENTOR.
Lionel Bray Wilson
BY
ATTORNEY

Patented Jan. 22, 1952

2,583,455

UNITED STATES PATENT OFFICE 2,583,455

METHOD AND APPARATUS FOR WELDING ALUMINUM AND ITS ALLOYS

Lionel Bray Wilson, Prescot, England, assignor to Williams & Watson Limited, Liverpool, England, a British company Application July 5, 1949, Serial No. 103,026
In Great Britain July 6, 1948

7 Claims. (Cl. 219—10)

This invention relates to an improved method and apparatus for welding aluminum and its alloys.

Hitherto difficulty has been experienced in welding aluminum and its alloys due to the fact that such materials pass rapidly from a solid to a fluid state when the melting point is reached, a rapid and sharp transition which must be contrasted with the period preceding the melting point of, say, a worked ferrous metal during which period the latter becomes relatively soft and malleable. The high heat conductivity of aluminum and its alloys prevent the ends of components made from these metals being raised to a sufficiently high temperature and for a depth great enough to allow the components to be forced together and at the same time effect a complete union of the metal unless a high current density is used.

An object of the present invention is to provide a method whereby aluminum and its alloys may be satisfactorily welded on a resistance welding machine. A further object of the present invention is to provide a method and apparatus whereby the component members of a window frame fabricated from aluminum or its alloys may be satisfactorily welded together.

According to the present invention a method of welding aluminum and its alloys in a resistance welding machine comprises the steps of flashing the ends of the components to be welded together, bringing the components into actual contact with one another and maintaining them in contact sufficiently long for their adjoining ends to melt and when the molten metal separates or divides breaking the circuit, and thereafter joining the components together under the application of mechanical pressure and consolidating the joint. The current is off during the consolidation stage.

This 3-stage method, viz flashing, maintaining the components in contact until the joint melts and breaks the circuit, and thereafter consolidating the joint under mechanical pressure with the current off may be varied within the intended scope of the invention. Thus an intermediate stage may be introduced between the steps of flashing, and maintaining the ends of the components together until the joined ends melt. This said intermediate stage consists in compressing the components together subsequent to flashing, the current being off as compression takes place, withdrawing the components apart and then rejoining them and switching on the current so that adjoining ends of the components reach melting temperature. When operating this modified procedure it may be found convenient to rejoin the components using an increasing mechanical pressure after the current has been switched on and the metals are in contact.

Apparatus for carrying out the method according to the invention comprises a resistance welding machine incorporating the customary stationary head and movable slide adapted to support a fixed component and a displaceable component respectively in contact with contact blocks attached thereto, in which means are provded, after the dsplaceable component has been presented to the fixed component and the adjoining ends flashed and subsequently melted, for automatically re-joining the said adjoining ends and consolidating the joint under mechanical pressure, and means for automatically switching off the current prior to the final consolidation.

Movement of the slide carrying the displaceable component may be made responsive to the rotation of a cam plate supported on a rotatable shaft and designed to give effect to a period when the components are flashed, a period when they are held together in contact until the ends melt, and a period when the ends are forced together under mechanical pressure.

The said cam plate operating the slide may conveniently have associated with it on the same cam shaft, a plurality of cams operating in a predetermined sequence, a switch controlling the supply of current to the transformer of the resistance welding machine, and a pair of switches controlling the supply of current delivered to a clutch mechanism disposed between the cam shaft and its drive during the flashing and consolidation stages. The clutch mechanism may conveniently be provided by an electromagnetic clutch or again it may take the form of a dog clutch, the component parts of which are engaged in sequence by the energization of a solenoid.

The magnetic clutch may be automatically actuated and the drive to the cam shaft restored when the adjoining ends melt by a low voltage relay connected across the contact blocks which is energised when the adjoining ends of the components melt and break a circuit which includes the secondary coil of the transformer.

Figure 4:
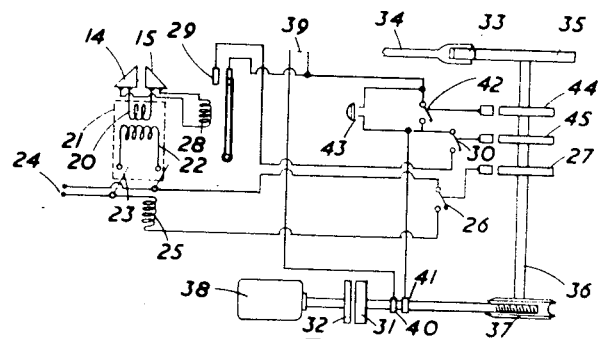

One particular embodiment of the invention will now be described by way of illustration with reference to the accompanying drawings in which:

Figure 1 represents a diagrammatic arrangement in elevation of a resistance welding machine, Figure 2 a diagrammatic plan view of the same machine, Figure 3 a development of the contour of the cam actuating the slide, Figure 4 a wiring diagram.

A resistance welding machine has a stationary head 12 and movable slide 13 supported upon a boss member 11. Contact blocks 14 and 15 are fixed to the stationary head and movable slide respectively and work pieces 16 and 17 are clamped against said contact blocks by means of clamps 18 and 19 respectively. Current is supplied to the contact blocks 14 and 15 from the secondary coil 20 of a transformer 21, the primary coil 22 of which is connected through contacts 23 to a source of alternating current 24, for example 400 volt, 50 cycle alternating current. The contacts 23 are controlled by an operating coil 25 which is in turn controlled by switch 26 and cam 27.

A low voltage relay 28 is connected across the contact blocks 14 and 15 and the contacts 29 of said relay control, through switch 30, an electromagnetic clutch 31 and armature 32.

Slide 13 is reciprocated through roller 33 and spindle 34 by means of a cam 35 mounted on a shaft 36 and which latter is driven through worm gearing 37 by an electric motor 38. The magnetic clutch and armature (31, 32) are disposed between said motor and said worm gear. The magnetic clutch is actuated by a source of direct current 39, e. g. 100 volts, via collecting rings 40, 41 and is controlled by switch 42 and push button 43. Switch 42 is in turn controlled by cam 44 mounted on cam shaft 36. A cam 45 controls switch 30.

The development shown at Figure 3 illustrates the contour of the cam 35, 35a representing the flashing portion, which extends for a 200° rotation, 35b the static portion when the ends of the components to be welded are maintained in contact until melting is effected and which extends for a 10° rotation and 35c the portion when the ends of the melted joint are rejoined under the application of mechanical pressure and which extends for a 60° rotation.

In operation, the work pieces 16, 17 are clamped against contact blocks 14, 15 respectively by means of clamps 18, 19 and motor 38 is then started. When the push button 43 is depressed and switch 42 closed current from source 39 passes through collecting rings 40, 41 and energises magnetic clutch 31; armature 32 is attracted to the magnetic clutch with the result that the motor 38 is then able to drive cam shaft 36 via worm gear 37 and the main cam 35 rotates and moves the slide 13 towards stationary head 12. In sequence cam 27 closes switch 26 with the result that alternating current from the source 24 energises coil 25 which in turn closes the main contacts 23. The primary coil 21 of the transformer is thus energised and current is caused to flow through the secondary circuit 20 of which the contact blocks 14, 15 and work pieces 16, 17 form a part.

As cam 35 continues to rotate slide 13 is moved forward and as the ends of the work pieces 16, 17 approach each other and touch flashing takes place and continues for about 200° of rotation of the cam 35 during which time the slide 13 has moved forward about ⅛".

Further rotation of the cam 35 carries roller 33 onto portion 35b. At this stage cam 44 opens switch 42 thus breaking the circuit between current source 39 and the magnetic clutch 31; the latter is thus demagnetized. At this point switch 30 is closed by means of cam 45 so that when relay 28 subsequently operates it will allow the magnetic clutch circuit to be completed.

So long as the ends of the work pieces 16 and 17 are in intimate contact the voltage across the relay 28 is too low to operate it. The main current from source 24 continues to flow across the joint between work pieces 16 and 17 with the result that after a few seconds the temperature of the metal at the joint has been raised to the melting point. The slide cannot move forward because at this juncture cam shaft 36 is stationary and in consequence the metal separates or divides at the joint thus opening the secondary circuit of the transformer. At this juncture the voltage across the ends of the work piece has increased with the result that the relay 28 is actuated. Its contacts 29 are closed and the magnetic clutch circuit is completed via closed switch 30. The armature 32 is again attracted to the magnetic clutch 31 and the drive restored to cam shaft 36. Cam 35 continues its rotation and roller 33 now comes on the portion 35b of the said cam with the result that the slide 13 is moved forward towards the stationary head 12 and the ends of the work pieces 16 and 17 are forced together, the welding current being off during the final consolidation of the joint and the current switched off; current source 24 is automatically cut out of circuit by switch 26 and cam 27 upon rotation of cam shaft 36 prior to re-engagement of the work pieces. Rotation of the cam shaft 36 is automatically stopped by switch 30 being opened by cam 45. The clamps 18 and 19 are then released and the welding machine is brought back to the zero position by manipulating press button 43 until the appropriate position is reached.

I claim:

1. A resistance welding machine adapted to weld aluminum and its alloys comprising in combination, a stationary head and a slide displaceable relative to said head, contact blocks respectively supported on said stationary head and said displaceable slide, a transformer adapted to energise said contact blocks the secondary coil of which is connected in circuit with said contact blocks, means for holding components to be welded in contact with said contact blocks, means for presenting one component supported on the displaceable slide to a second component supported on the stationary head whilst the adjoining ends of said components are flashed, means for maintaining the ends of the components after flashing in actual contact sufficiently long for the adjoining ends to melt and thereby break the transformer secondary coil circuit, means for joining the components together under the application of an applied pressure and consolidating the joint and means for automatically switching off the current during the said final consolidation.

2. A resistance welding machine adapted to weld aluminum and its alloys comprising in combination, a stationary head and a slide displaceable relative to said head, contact blocks respectively supported on said stationary head and said displaceable slide, a transformer adapted to energise said contact blocks the secondary coil of which is connected in circuit with said contact blocks, means for holding components to be welded in contact with said contact blocks, a cam plate supported upon a rotatable shaft engaging with said displaceable slide having consecutive surfaces of engapement adapted to move the slide towards the stationary head so that the adjoining ends of components located upon said stationary head and displaceable slide are flashed, to maintain the ends of the components after flashing in actual contact sufficiently long for the adjoining ends to melt and thereby break the transformer secondary coil circuit, and thereafter to join the components together under the application of an applied pressure and consolidate the joint, and means for automatically switching off the current during the said final consolidation.

3. A resistance welding machine adapted to weld aluminum and its alloys comprising in combination, a base support member, a stationary head and slide displaceable relative to said head, each mounted upon said base support member, contact blocks respectively supported on said stationary head and said displaceable slide, a transformer adapted to energise said contact blocks the secondary coil of which is connected in circuit with said contact blocks, means for energising said transformer, means for holding components to be welded in contact with said contact blocks, a cam shaft rotatably journalled at one end of said base support member, a cam plate supported upon said rotatable cam shaft, means for driving said cam shaft including an electro-magnetic clutch mechanism for interrupting the drive, means for energising said electro magnetic clutch, said cam plate engaging with said displaceable slide and having consecutively disposed surfaces of engagement adapted to move the slide towards the stationary head so that the adjoining ends of components located upon said stationary head and slide are flashed and to maintain the ends of the components in actual contact sufficiently long for the adjoining ends to melt and thereby break the transformer secondary coil circuit, and thereafter to join the components together under the application of an applied pressure and consolidate the joint, three switch-operating cams disposed one above each other on the said rotatable cam shaft and arranged angularly relative to said shaft such that they operate in sequence a switch which controls current energising the transformer, a switch which controls the supply of current to said electro magnetic clutch during the flashing stage and a switch which controls the electro magnetic clutch during the consolidation stage, and means for automatically switching off the current to the transformer during the final consolidation.

4. A resistance welding machine adapted to weld aluminum and its alloys comprising in combination, a base support member, a stationary head and slide displaceable relative to said head, each mounted upon said base support member, contact blocks respectively supported on said stationary head and said displaceable slide, a transformer adapted to energise said contact blocks the secondary coil of which is connected in circuit with said contact blocks, means for energising said transformer, means for holding components to be welded in contact with said contact blocks, a cam shaft rotatably journaled at one end of said base support member, a cam plate supported upon said rotatable cam shaft, means for driving said cam shaft including an electro magnetic clutch mechanism for interrupting the drive, means for energising said electro magnetic clutch, means for restoring the drive to the cam shaft when the adjoining ends of components undergoing welding melt comprising a low voltage relay connected across the contact blocks in circuit with the electro magnetic clutch; said cam plate engaging with said displaceable slide and having consecutively disposed surfaces of engagement adapted to move the slide towards the stationary head so that the adjoining ends of components located upon said stationary head and slide are flashed and to maintain the ends of the components in actual contact sufficiently long for the adjoining ends to melt and thereby break the transformer secondary coil circuit, and thereafter to join the components together under the application of an applied pressure and consolidate the joint, three switch-operating cams disposed one above each other on the said rotatable cam shaft and arranged angularly relative to said shaft such that they operate in sequence a switch which controls current energising the transformer, a switch which controls the supply of current to said electro magnetic clutch during the flashing stage and a switch which controls the electro magnetic clutch during the consolidation stage, and means for automatically switching off the current to the transformer prior to the final consolidation.

5. A method of resistance welding of aluminum and aluminum-containing components of relatively small cross-sectional area comprising the successive steps of (a) flashing the ends of the components in order to make the ends uniform, (b) bringing the ends of the components into intimate contact with one another under light pressure while maintaining the application of welding current, (c) maintaining the ends of the components in intimate contact with one another until the ends of the said components are raised to the melting point of the metal by virtue of the heat generated as a result of the resistance offered to the flow of welding current across the abutting surfaces, (d) continuing to maintain the ends of the components in intimate contact until the metal melts sufficiently to break the welding current circuit thereby indicating that welding temperature has been reached, and (e) immediately bringing the ends of the components together under heavy pressure, the welding current being off during the final consolidation of the joint.

6. A method of resistance welding of aluminum and aluminum-containing components of relatively small cross-sectional area comprising the successive steps of (a) flashing the ends of components in order to make the ends uniform, (b) compressing together the ends of the components under mechanical pressure in the absence of any welding current and thereafter separating the components, (c) bringing the ends of the components into intimate contact with one another under light pressure with the welding current restored, (d) maintaining the ends of the components in intimate contact with one another until the ends of the components are raised to the melting point of the metal by virtue of the heat generated as a result of the resistance offered to the flow of welding current across the abutting surfaces, (e) continuing to maintain the ends of the components in intimate contact until the metal melts sufficiently to break the welding current circuit thereby indicating that welding temperature has been reached, and (f) immediately bringing the ends of the components together under heavy pressure, the welding current being off during the final consolidation of the joint.

7. The method of resistance welding of aluminium and aluminium-containing components of relatively small cross-sectional area as claimed in claim 6 wherein the ends of the components are brought together at step (c) under the influence of a progressively increasing mechanical pressure.

LIONEL BRAY WILSON.

REFERENCES CITED

The following references are of record in the file of this patent:

UNITED STATES PATENTS

| Number | Name | Date |
|---|---|---|
| 1,434,285 | Gale | Oct. 31, 1922 |
| 1,780,297 | Heineman | Nov. 4, 1930 |
| 2,085,049 | Spire | June 29, 1937 |
| 2,231,317 | Bernard | Feb. 11, 1941 |

FOREIGN PATENTS

| Number | Country | Date |
|---|---|---|
| 280,659 | Great Britain | Nov. 24, 1927 |